(12) United States Patent
Fontvieille et al.

(10) Patent No.: US 9,435,714 B2
(45) Date of Patent: Sep. 6, 2016

(54) DIAGNOSTICS METHOD AND SYSTEM FOR A POWER PLANT HAVING TWO STAGED TURBOCOMPRESSORS

(75) Inventors: Laurent Fontvieille, Gif-sur-Yvette (FR); Ludovic Martin, Villebon sur Yvette (FR); Remy Brunel, Dourdan (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 225 days.

(21) Appl. No.: 14/347,323

(22) PCT Filed: Sep. 11, 2012

(86) PCT No.: PCT/FR2012/052023
§ 371 (c)(1),
(2), (4) Date: Apr. 30, 2014

(87) PCT Pub. No.: WO2013/045785
PCT Pub. Date: Apr. 4, 2013

(65) Prior Publication Data
US 2014/0230530 A1   Aug. 21, 2014

(30) Foreign Application Priority Data

Sep. 26, 2011   (FR) ...................... 11 58540

(51) Int. Cl.
*G01M 15/04* (2006.01)
*F02D 41/22* (2006.01)
(Continued)

(52) U.S. Cl.
CPC .......... *G01M 15/044* (2013.01); *F02B 37/013* (2013.01); *F02B 37/16* (2013.01);
(Continued)

(58) Field of Classification Search
CPC . Y02T 10/144; F02D 41/0007; F02D 43/04; F05D 2220/40; G01M 15/044
USPC ........................................ 73/114.13
See application file for complete search history.

(56) References Cited

U.S. PATENT DOCUMENTS 6,785,604 B2 * 8/2004 Jacobson ................ F02B 37/00
    701/114
7,469,577 B2 * 12/2008 Barton .................. G01M 15/09
    73/114.77
(Continued)

FOREIGN PATENT DOCUMENTS

FR     2 941 267       7/2010
JP    2005 220890     8/2005

OTHER PUBLICATIONS

International Search Report Issued Nov. 5, 2012 in PCT/FR12/052023 filed Sep. 11, 2012.

(Continued)

*Primary Examiner* — Freddie Kirkland, III
(74) *Attorney, Agent, or Firm* — Oblon, McClelland, Maier & Neustadt, L.L.P.

(57) ABSTRACT

A diagnostics method and system for a power plant including at least one low-pressure turbocompressor and at least one high-pressure turbocompressor, the turbocompressors being staged and supplying an internal combustion engine, the power plant being fitted to a motor vehicle. The method includes determining a mode of operation of the power plant, determining a power of the high-pressure turbine based on a first set of data and based on the mode of operation, determining the power of the high-pressure turbine based on a second set of data, determining a failure criterion as being the ratio between the power of the high-pressure turbine dependent on the first set of data and the power of the high-pressure turbine dependent on the second set of data, and comparing the failure criterion against stored values to determine whether there is a failure.

10 Claims, 3 Drawing Sheets

(51) Int. Cl.
*F02B 37/013* (2006.01)
*F02D 41/00* (2006.01)
*F02B 37/16* (2006.01)
*F02B 37/18* (2006.01)
*F02B 39/16* (2006.01)

(52) U.S. Cl.
CPC ......... *F02D41/0007* (2013.01); *F02D 41/221* (2013.01); *F02B 37/183* (2013.01); *F02B 2039/164* (2013.01); *F02B 2039/166* (2013.01); *F02B 2039/168* (2013.01); *Y02T 10/144* (2013.01); *Y02T 10/40* (2013.01)

(56) References Cited

U.S. PATENT DOCUMENTS

| | | | | |
|---|---|---|---|---|
| 7,668,704 B2 * | 2/2010 | Perchanok | ......... | F02D 41/0007 703/2 |
| 7,861,580 B2 * | 1/2011 | Sujan | ...... | F01D 17/06 73/114.77 |
| 8,181,509 B2 * | 5/2012 | Ibuki | ...... | F02B 37/013 73/114.77 |
| 8,522,551 B2 * | 9/2013 | Tomita | ...... | F02B 37/004 123/562 |
| 8,567,192 B2 * | 10/2013 | Chi | ...... | F02B 37/18 123/562 |
| 8,931,271 B2 * | 1/2015 | Fontvieille | ...... | F02D 23/00 60/602 |
| 9,169,796 B2 * | 10/2015 | Petrovic | ...... | F02D 41/182 |
| 9,181,857 B2 * | 11/2015 | Petrovic | ...... | F02B 37/013 |
| 9,217,362 B2 * | 12/2015 | Wang | ...... | F02B 37/013 |
| 2003/0216856 A1 * | 11/2003 | Jacobson | ...... | F02B 37/00 701/114 |
| 2009/0314082 A1 | 12/2009 | Sujan et al. | | |
| 2011/0154892 A1 | 6/2011 | Ibuki et al. | | |
| 2012/0016602 A1 | 1/2012 | Fontvieille et al. | | |
| 2012/0109490 A1 * | 5/2012 | Panciroli | ...... | F02B 37/16 701/102 |
| 2014/0067230 A1 * | 3/2014 | Liu | ...... | F02D 41/0007 701/102 |

OTHER PUBLICATIONS

French Search Report Issued Jun. 27, 2012 in French Patent Application No. 11 58540 filed Sep. 26, 2011.

* cited by examiner

DIAGNOSTICS METHOD AND SYSTEM FOR A POWER PLANT HAVING TWO STAGED TURBOCOMPRESSORS

BACKGROUND

The field of the invention is failure diagnostics for an internal combustion engine provided with a turbocharger, and more particularly power trains provided with two staged turbochargers.

The air supercharging of an engine makes it possible to increase the performance levels of the engine by accepting, for the combustion of the fuel, a mass of air greater than in an atmospheric engine of equivalent cylinder size.

A supercharging device can comprise a turbocharger, comprising on the one hand a compressor which supplies the engine with air at a pressure greater than atmospheric pressure, and on the other hand, a turbine that is passed through by the exhaust gases from the engine.

The power supplied to the turbine by these exhaust gases is transmitted, via a shaft, to the compressor which compresses the air sucked from the outside environment to a pressure called supercharging pressure.

With the current trend to increase the specific performance of the engines, the supercharging pressure values demanded of the turbochargers are becoming increasingly higher. The turbochargers are subject to very high mechanical stresses, which affects their reliability. It is therefore important to accurately control their state of operation and to diagnose the occurrence of any mechanical failure so as, for example, to limit the engine performance levels and/or to alert the driver of the need for a repair.

Also, these mechanical failures are often preceded by a turbocharger supercharging pressure regulation fault which can cause the legal level of the polluting emissions from the engine to be exceeded. The OBD (On Board Diagnosis) standards concerning embedded diagnosis on board vehicles require the driver to be alerted to any such overshoot. It is therefore important to diagnose the failure or the malfunction of a turbocharger in order to meet these standards.

Currently, the diagnosis of internal or external leaks in the supercharging intake circuit is based on the comparison of the integral of the turbocharger regulation loop deviation to a detection threshold. In the case of a failing compressor bypass, the measured pressure is lowered to the expected pressure, which makes it possible to detect a failure. Furthermore, there is a dead band above which the integral is not computed, in order to take into account the accuracy of the supercharging regulation. Similarly, the computation is not performed when the setpoint varies too rapidly.

The current diagnostics work only when the supercharging regulation is activated. Furthermore, these performance levels are highly dependent on the behavior of the control of the supercharging and of the control of the EGR. In practice, the calibrations greatly impact the supercharging response mask. Also, since the strategy is based on a looping error, an internal or external leak in the supercharging intake circuit will not be detected at stabilized rotation speed because of the action of the integrator of the supercharging regulator.

There is a need for a method and a system for diagnosing leaks that makes it possible to reduce the significance of the calibration and also that makes it possible to diagnose the power train operating at stabilized rotation speed.

There is therefore a need for a device for diagnosing the internal or external leak in the supercharging intake circuit that is capable of detecting the risk of an increase in polluting emissions, and the risk of high-pressure turbocharger overspeed.

In practice, an internal leak in the compressor bypass can lead to a reduction of the supercharging pressure and of the air flow rate, resulting in an increase in polluting emissions.

With an internal leak in the compressor bypass, the supercharging regulation will naturally compensate for the leak by rotating the high-pressure turbocharger faster potentially up to the destruction thereof because of an excessively high rotation speed.

An external leak can lead to a reduction of the supercharging pressure that the supercharging regulation will compensate for by rotating the high-pressure turbocharger faster potentially up to the destruction thereof because of an excessively high rotation speed.

BRIEF SUMMARY

According to one aspect, there is proposed a method for diagnosing a power train provided with at least one low-pressure turbocharger and at least one high-pressure turbocharger, the turbochargers being staged and supplying an internal combustion engine, the power train being installed in an engine vehicle. The method comprises the following steps:

the mode of operation of the power train is determined,
the power of the turbine is determined as a function of a first set of data and as a function of the mode of operation,
the power of the turbine is determined as a function of a second set of data,
a failure criterion is determined as the ratio between the power of the turbine that is a function of the first set of data and the power of the turbine that is a function of the second set of data, and
the failure criterion is compared to stored values to determine whether a failure exists.

The diagnostic method offers the advantage of being easy to calibrate, of adapting easily to the operating conditions of the power train, and of being usable both in stabilized conditions and in transient conditions.

The first set of data can be a set of data determined on the side of the high-pressure turbine.

The first set of data can comprise the speed of rotation of the high-pressure turbine and the temperature upstream of the high-pressure turbine.

The first set of data can comprise the pressure upstream of the high-pressure turbine and the temperature upstream of the high-pressure turbine.

When the power train comprises a high-pressure bypass connected between the inlet and the outlet high-pressure turbine, the first set of data can comprise the position of the high-pressure bypass, the temperature upstream of the high-pressure turbine and the speed of rotation of the high-pressure compressor.

The second set of data can be a set of data determined on the side of the high-pressure compressor.

The second set of data comprises the speed of rotation of the high-pressure compressor, the supercharging pressure and the speed of rotation of the internal combustion engine.

The mode of operation can be determined as a function of the position of the high-pressure bypass and of the pressure upstream of the high-pressure turbine.

According to another aspect, there is proposed a diagnostic system for a power train provided with at least one low-pressure turbocharger and at least one high-pressure turbocharger, the turbochargers being staged and supplying an internal combustion engine, the power train being installed in an engine vehicle. The diagnostic system comprises a means for determining the mode of operation of the power train linked at the output to a first means of estimating the power of the high-pressure turbine, the diagnostic system also comprising a second means of estimating the power of the high-pressure turbine and a means of estimating a failure criterion connected at the input to the first means of estimating the power of the high-pressure turbine and to the second means of estimating the power of the high-pressure turbine and at the output to a comparison means suitable for comparing the failure criterion to stored values.

The first means of estimating the power of the high-pressure turbine can comprise at least one means for modeling the high-pressure turbocharger, the first estimation means being able to use the means for modeling the high-pressure turbocharger corresponding to the signal received from the means for determining the mode of operation of the power train.

BRIEF DESCRIPTION OF THE DRAWINGS

Other aims, features and advantages will become apparent on reading the following description given solely as a nonlimiting example and with reference to the appended drawings in which.

DETAILED DESCRIPTION

Figure 1:
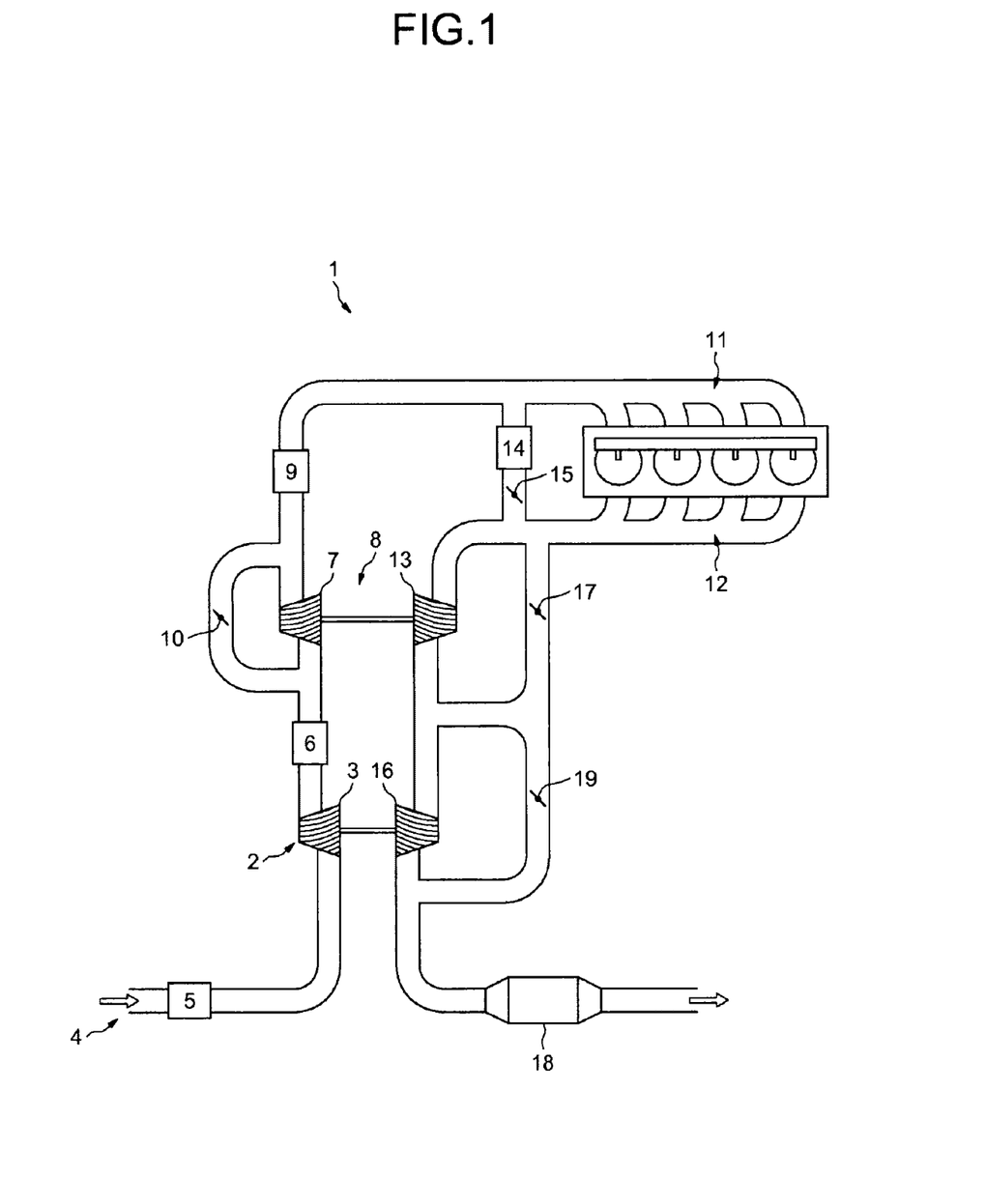
FIG. 1 illustrates a power train with two staged turbochargers.

In FIG. 1, a power train 1 can be seen comprising a low-pressure turbocharger 2 whose compressor 3 is linked to the inlet to a fresh air intake 4 and to a sensor 5 suitable for determining the intake air temperature and the intake air flow rate. The low-pressure compressor 3 is linked to the outlet to a low-pressure exchanger 6 which is in turn linked to the compressor 7 of a high-pressure turbocharger 8. The outlet of the high-pressure compressor 7 is linked on the one hand to a high-pressure exchanger 9 and on the other hand to a bypass valve 10, called high-pressure compressor bypass, via a pipe tapped between the high-pressure exchanger 9 and the outlet of the high-pressure compressor 7. The outlet of the bypass 10 of the high-pressure compressor is tapped between the low-pressure exchanger 6 and the inlet of the compressor of the high-pressure turbocharger 7.

The outlet of the high-pressure exchanger 9 is linked to the intake manifold 11 of the internal combustion engine. The exhaust manifold 12 of the internal combustion engine is linked to the inlet of the turbine 13 of the high-pressure turbocharger 8. An exhaust gas recirculation (EGR) circuit comprises a cooler 14 connected in series with an EGR valve 15. The EGR circuit is tapped between the intake manifold 11 and the exhaust manifold 12 such that the EGR valve 15 is situated on the side of the exhaust manifold 12 and that the cooler 14 is situated on the side of the intake manifold 11.

The outlet of the high-pressure turbine 13 is linked to the inlet of the low-pressure turbine 16. A high-pressure bypass duct 17 is connected between the outlet of the high-pressure turbine 13 and the inlet of the high-pressure turbine 13, more particularly between the intake manifold 12 and the EGR circuit.

The outlet of the low-pressure turbine 16 is connected to an exhaust duct by a particulate filter 18. A low-pressure discharge valve 19 ("waste gate") is tapped on the one hand between the outlet of the low-pressure turbine 16 and the inlet of the particulate filter 18 and, on the other hand, between the outlet of the high-pressure turbine 13 and the inlet of the low-pressure turbine 16.

The diagnostic method makes it possible to diagnose the integrity of the supercharging intake circuit by using a turbomachine model, independently of the performance levels and of the activation of the supercharging regulation, regardless of the exhaust gas recirculation configuration, in stabilized or transient conditions, and without adding any additional sensor. The diagnostic method also makes it possible to limit the calibration needs to the minimum.

For this, a criterion is defined which is the ratio between the estimation of the power of the turbine by two different means. A first estimation is made as a function of the data relating to the power train which are situated on the side of the turbine. A second estimation is made as a function of the data relating to the power train which are situated on the side of the compressor. This criterion makes it possible to estimate, in a very satisfactory manner, a malfunction of the supercharging intake circuit.

According to the elements described above with reference to FIG. 1, the high-pressure turbocharger 8 comprises a turbine 13 supplied with exhaust gases and a compressor 7 which compresses the intake gases, these two elements being connected by a shaft. The speed of rotation of the shaft $\omega_{tC}$ (in rad/s) or $N_{tC}$ (in rpm) is determined by the power budget between the turbine and the compressor expressed in the following equation:

$$\frac{d}{dt}\left(\frac{1}{2}J\omega_{TC}^2\right) = POW_t - POW_c \qquad \text{(eq. 1)}$$

with J: the inertia of the turbine
POWt=the power of the turbine
POWc=the power of the compressor The power of the high-pressure turbine is expressed by the following equation:

$$POW_t = W_t T_{ut} \eta_t c_{p,exh}\left(1 - PR_t^{\frac{1-\gamma}{\gamma}}\right) \qquad \text{(eq. 2)}$$

with $W_t$: the mass flow rate of the turbine
$T_{ut}$: the temperature upstream of the turbine
r|t: the efficiency of the turbine
$C_{p,exh}$: the mass heat capacity at the exhaust
$PR_t$: the compression ratio of the turbine
γ: the ratio of the mass heat capacities The power of the high-pressure compressor is expressed by the following equation:

$$POW_c = W_c T_{uc} \frac{1}{\eta_c} c_{p,adm}\left(PR_c^{\frac{\gamma-1}{\gamma}} - 1\right) \qquad \text{(eq. 3)}$$

with $W_c$: the mass flow rate of the compressor
$T_{uc}$: the temperature upstream of the compressor $r|_c$: the efficiency of the compressor
$C_p$,adm: the mass heat capacity at the intake
$PR_c$: the compression ratio of the compressor The compressor can be modeled according to static relationships describing its operation. These static relationships make it possible to limit the compression ratio $PR_c$ and the efficiency of the compressor $r|_c$ to the speed of the compressor $N_{tc}$ and to the flow rate passing through it $W_c$. These dependencies are represented in the form of two-dimensional mappings.

These static mappings are expressed as a function of the corrected compressor speed $N_{c,cor}$ and of the corrected compressor flow rate $W_{c,cor}$ in relation to the standard conditions defined by a reference pressure $P_{ref,c}$ and a reference temperature $T_{ref,c}$, given by the supplier in order to take account of the different conditions upstream of the compressor.

The corrected compressor speed $N_{c,cor}$ and the corrected compressor flow rate $W_{c,cor}$ are given by the following equations:

$$N_{c,cor} = N_{tc}\sqrt{\frac{T_{ref,c}}{T_{uc}}} \quad \text{(eq. 4)}$$

$$W_{c,cor} = W_c\sqrt{\frac{T_{ac}}{T_{ref,c}}}\frac{P_{ref,c}}{P_{uc}} \quad \text{(eq. 5)}$$

with $P_{uc}$: the pressure upstream of the high-pressure compressor.

The compression ratio and the efficiency of the compressor are then computed by the following static relationships:

$$PR_c = f_{c,n}\left(N_{tc}\sqrt{\frac{T_{ref,c}}{T_{uc}}}, W_c\sqrt{\frac{T_{uc}}{T_{ref,c}}}\frac{P_{ref,c}}{P_{uc}}\right) \quad \text{(eq. 6)}$$

$$\eta_c = f_{c,\eta}\left(N_{tc}\sqrt{\frac{T_{ref,c}}{T_{uc}}}, W_c\sqrt{\frac{T_{uc}}{T_{ref,c}}}\frac{P_{ref,c}}{P_{uc}}\right) \quad \text{(eq. 7)}$$

The relationships $f_{c,n}$ and $f_{c,\eta}$ are mappings with two inputs, for the range of rotation speed and of operating flow rate of the compressor, in the reference conditions chosen by the manufacturer to establish these characterizations on the test bench.

Alternatively, the compression ratio $PR_c$ can be determined by modeling the low-pressure turbocharger. The turbocharger is correlated to three parameters, the air flow rate of the compressor determined by a sensor such as an air flow meter, the pressure downstream of the low-pressure turbine determined also by a sensor, and the temperature upstream of the low-pressure turbine determined by a rotation speed/load mapping.

The air flow rate of the low-pressure turbine is considered to be equal to the fresh air flow rate measured by the air flow meter. The mappings of the compressor and of the turbine are then used to estimate the missing quantities, that is to say the ratio of pressures and the efficiencies by virtue of the following equations:

$$P_c = W_c C_p \frac{1}{\eta_c} T_{uc}\left(PR_c^{\frac{\gamma-1}{\gamma}} - 1\right) \quad \text{(eq. 8)}$$

$$P_t = W_t C_p \eta_t T_{ut}\left(1 - \left(\frac{1}{PR_t}\right)^{\frac{\gamma-1}{\gamma}}\right) \quad \text{(eq. 9)}$$

$$J \cdot N \frac{dN}{dt} = P_t - P_c \quad \text{(eq. 10)}$$

with:
$P_c$: the power of the low-pressure compressor,
$P_t$: the power of the low-pressure turbine,
$W_c$: the flow rate of the low-pressure compressor,
$W_t$: the flow rate of the low-pressure turbine,
$r|_c$: the efficiency of the low-pressure compressor,
$r|_t$: the efficiency of the low-pressure turbine,
$T_{uc}$: the temperature upstream of the low-pressure compressor,
$T_{ut}$: the temperature upstream of the low-pressure turbine,
$PR_c$: the low-pressure compression ratio,
$PR_t$: the expansion ratio of the low-pressure turbine,
$C_p$ and $\gamma$: thermodynamic constants,
N: the speed of rotation of the low-pressure turbocharger,
J: the inertia of the low-pressure turbocharger.

As for the compressor, the efficiency and the flow rate of the turbine are expressed as a function of the expansion ratio and the corrected turbocharger speed:

$$N_{t,cor} = N_{tc}\sqrt{\frac{T_{ref,t}}{T_{ut}}} \quad \text{(eq. 11)}$$

$$W_{t,cor} = W_t\sqrt{\frac{T_{ut}}{T_{ref,t}}}\frac{P_{ref,t}}{P_{ut}} \quad \text{(eq. 12)}$$

with
Tref,t=reference temperature
Pref,t=reference pressure
Nt,cor=corrected turbine speed
Wt,cor=corrected turbine flow rate A first mapping of flow rate $f_{t,W}$ of the turbine links the flow rate of the gases passing through the turbine 27 to the speed of rotation of the turbine to the expansion ratio $PR_t$ of the turbine and to the position $u_{VGT}$ of the actuator. A second mapping of efficiency $f_{t_\eta}$ of the turbine also links the efficiency of the turbine $\eta_t$ to the speed of rotation of the turbine, to the expansion ratio $PR_t$ of the turbine and to the position $u_{VGT}$ of the actuator.

These mappings with three inputs are generally established in reference conditions chosen by the manufacturer to establish all these characterizations on the test bench.

According to these mappings, the corrected value of the flow rate of the turbine $W_{t,cor}$ and the efficiency of the turbine $r|_t$ are given by the following static relationships:

$$W_{t,cor} = f_{t,W}\left(N_{tc}\sqrt{\frac{T_{ref,i}}{T_{ut}}}, PR_i\right) \quad \text{(eq. 13)}$$

$$\eta_i = f_{i,\eta}\left(N_{tc}\sqrt{\frac{T_{ref,i}}{T_{ut}}}, PR_i\right) \quad \text{(eq. 14)}$$

Equations 13 and 14 then make it possible to determine the efficiency $r|_t$.

The presence of the high-pressure bypass duct has no effect on the characteristics of the turbine, but does modulate its flow rate. In practice, when the high-pressure bypass duct is open, the equality between the flow rate of the compressor and the flow rate of the turbine is no longer assured. It is therefore essential to introduce an additional measurement to have an estimation of the turbine flow rate. This measurement is the pressure upstream of the high-pressure turbine $P_{avt}$.

Figure 2:
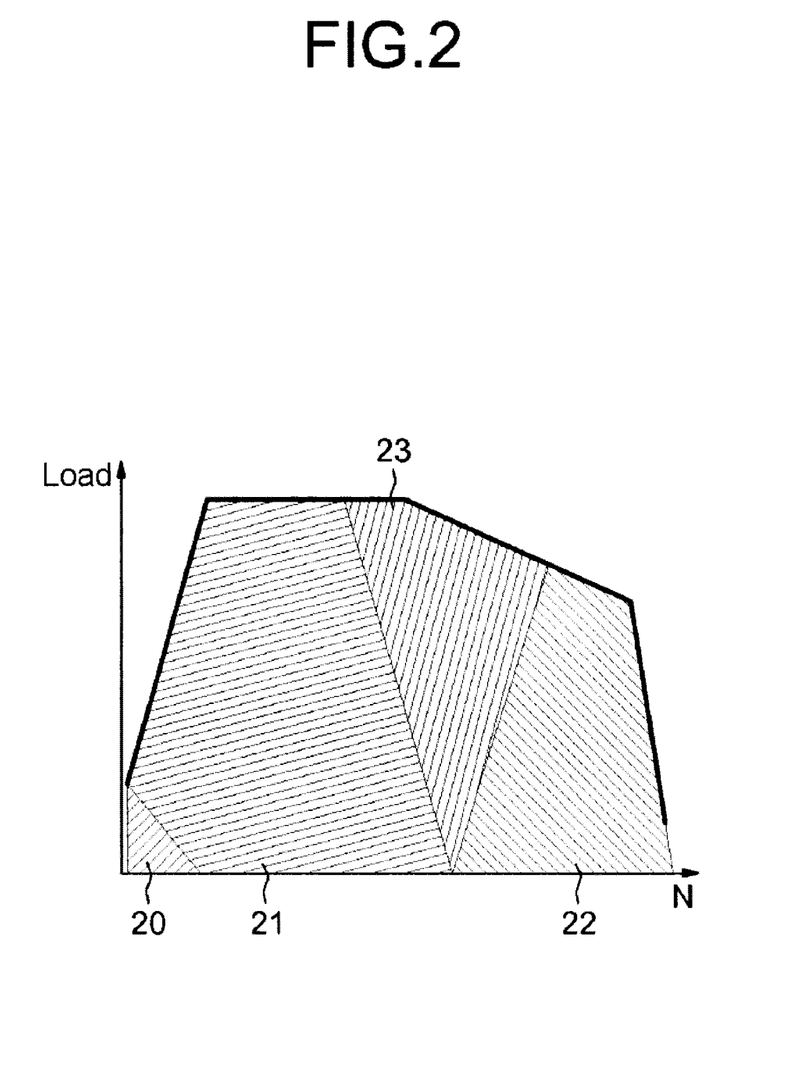
FIG. 2 illustrates a rotation speed/load diagram of a power train with two staged turbochargers.

By virtue of the preceding equations, the values $POW_t$ and $POW_c$ can be determined. However, the power train involves different operating phases which imply different conditions for determining the values $POW_t$ and $POW_c$. FIG. 2 illustrates the main areas of operation of the dual supercharging in the engine rotation speed/load plane.

At very low load and low rotation speed, in the zone 20, the bypass of the high-pressure turbine is closed, the high-pressure turbocharger is not controlled. The bypass of the high-pressure compressor is closed. The low-pressure discharge valve is closed.

From medium load to high load and at low rotation speed, in the zone 21, the bypass of the high-pressure compressor and the low-pressure discharge valve are closed. The high-pressure turbocharger is controlled like a single-stage turbocharger.

At high rotation speed, in zone 22, the bypass of the high-pressure turbine and the bypass of the high-pressure compressor are open.

In the intermediate zone 23, the high-pressure turbocharger is used only in transient conditions.

The criterion will therefore be determined for each of the above three operating situations.

To determine the power of the turbocharger as a function of the data available on the turbine side, three possibilities have to be distinguished. A first possibility corresponds to the case of the operation with the bypass of the high-pressure turbine closed (zone 20 of FIG. 2), a second case when the bypass of the turbine is open and when the measurement of the pressure upstream of the turbine is possible (zone 21 of FIG. 2), and a third case when the bypass of the turbine is open and when only the position of the bypass of the high-pressure turbine is available (zone 22 of FIG. 2). For the three configurations, there is a specific turbine power computation.

For the first case, the flow rate of the turbine is measured, the expansion ratio $PR_{t,est}$ is estimated and then the power of the turbine $POW_{t,closed}$ is estimated using the following equations:

$$PR_{t,est} = f(N_{tc,est}, W_t) \qquad \text{(eq. 15)}$$

$$POW_{t,CLOSED} = W_t T_{ut} \eta_{t,est}(W_t, N_{tc,est}) C_{p,esb}\left(1 - PR_{t,est}^{\frac{1-\gamma}{\gamma}}\right) \qquad \text{(eq. 16)}$$

For the second case, the pressure upstream of the high-pressure turbine $P_{ut}$ is measured, then the expansion ratio $PR_{t,est}$ is estimated by the application of the following equation:

$$PR_{t,est} = P_{ut}/P_{dt,est} \qquad \text{(eq. 17)}$$

The flow rate of the turbine $W_{t,est}$ is then estimated as a function of the estimated speed of rotation of the turbocharger $N_{tc,est}$ and of the estimated expansion ratio $RP_{t,est}$ by the application of the following equation:

$$W_{t,est} = f(N_{tc,est}, PR_{t,est}) \qquad \text{(eq. 18)}$$

Finally, the power of the turbine $POW_{t,OPENED,Put}$ is estimated as a function of the estimated efficiency of the turbine $r|_{t,est}$ by the application of the following equation:

$$POW_{t,OPENED,Put} = W_{t,est} T_{ut} \eta_{t,est}(W_{t,est}, N_{tc,est}) C_{p,esb}\left(1 - PR_{t,est}^{\frac{1-\gamma}{\gamma}}\right) \qquad \text{(eq. 19)}$$

For the third case, the position of the bypass $X_{thp}$ is measured which makes it possible to deduce the section of the bypass $S_{thp}$.

$$S_{thp} = f(X_{thp}) \qquad \text{(eq.20)}$$

Using a recurrence relationship, the flow rate $W_{thp,est}$ passing through the bypass of the high-pressure turbine is determined by applying the Barré st Venant formula. Then, the flow rate of the high-pressure turbine $W_{t,est}$ is estimated and then the pressure upstream of the high-pressure turbine $P_{ut,est}$ is estimated by calculating the mass balance in the exhaust manifold.

$$W_{thp,est} = S_{thp} \cdot \frac{P_{ut,n-1}}{\sqrt{T_{ut}}} \cdot \psi(PR_{t,est,n-1}) \qquad \text{(eq. 21)}$$

with (eq. 22)

$$\psi = \sqrt{\frac{2 \cdot \gamma}{R \cdot (\gamma - 1)} \cdot \sqrt{PR_t^{\frac{-2}{\gamma}} - \gamma \cdot PR_t^{\frac{-(\gamma-1)}{\gamma}}}}$$

$$W_{t,est} = f(N_{tc,est}, PR_{t,est,n-1}) \qquad \text{(eq. 23)}$$

$$P_{ut,est} = \frac{R \cdot T_{ut}}{V_{ut}} \sum (W_c - W_{t,est} - W_{thp}) \qquad \text{(eq. 24)}$$

$$PR_{t,est} = P_{nt,est}/P_{dt,est} \qquad \text{(eq. 25)}$$

Finally, the power of the turbine $POW_{t,OPENED,xthp}$ is estimated by the application of the following equation:

$$POW_{t,OPENED,Xthp} = \qquad \text{(eq. 26)}$$
$$W_{t,est} \cdot T_{ut} \cdot \eta_{t,est} \cdot (W_{t,est}, N_{tc,est}) \cdot C_{p,esb} \cdot \left(1 - PR_{t,est}^{\frac{1-\gamma}{\gamma}}\right)$$

As can be seen, the expression that can be used to determine the power of the turbine is the same in the three areas of operation, only the steps used to obtain the values necessary to the power computation differ.

Once the power of the turbocharger is determined as a function of the information available on the turbine side, the power of the turbocharger is determined as a function of the information available on the compressor side.

For this, the supercharging pressure $P_{sg,mes}$ is measured, then the compression ratio $PR_{c,est}$ is estimated by the application of the following equation:

$$PR_{c,est} = \frac{P_{sg,mes} + f_{RAS}(W_c)}{P_{uc} - f_{faa}(W_c)} \qquad \text{(eq. 27)}$$

with
$f_{RAS}(W_c)$=the load losses in the air cooler 9 in the form of a function $f_{RAS}$ of the flow rate $W_c$ $f_{RAS}(W_c)$=the load losses in the air filter situated at the fresh air intake in the form of a function $f_{faa}$ of the air mass flow rate $W_c$.

The speed of rotation of the turbocharger $N_{tc,est}$ and the estimated power of the compressor $POW_{c,CPR}$ are then estimated by the application of the following equations:

$$N_{tc,est} = f_{Nt}(PR_{c,est}, N_c)\sqrt{\frac{T_{uc}}{T_{ref,c}}} \qquad \text{(eq. 28)}$$

$$POW_{c,est} = W_c T_{uc} \frac{1}{\eta_c(W_c, N_{tc,est})} c_{p,adm}\left(PR_c^{\frac{\gamma-1}{\gamma}} - 1\right) \qquad \text{(eq. 29)}$$

Finally, the power of the turbine $POW_t$,cpR is estimated by the application of the following equation:

$$POW_{t,CPR} = POW_{c,est} + \left(\frac{\pi}{30}\right)^2 J N_{tc,est} \frac{dN_{tc,est}}{dt} \qquad \text{(eq. 30)}$$

with $P_{uc}$ and $T_{uc}$ supplied by the dynamic estimators described in the French patent application FR2932224.

The pressure $P_{uc}$ at the inlet of the compressor and the temperature $T_{uc}$ at the inlet of the compressor can be determined by a dynamic estimator of the low-pressure turbocharger.

Once the power of the turbine determined via the information available on the turbine side and on the compressor side is available, the criterion $\epsilon$ can be determined.

The constraints relating to the area of operation of the power train, put forward in the determination of the power of the turbine as a function of the information available on the turbine side, also apply to the determination of the criterion.

In the first case, when the turbine bypass is closed, the following applies:

$$\varepsilon_{t,CLOSED} = \frac{POW_{t,CLOSED}}{POW_{t,CPR}} \qquad \text{(eq. 32)}$$

$$= \left(1 + \frac{W_{carb}}{W_c}\right) \frac{T_{ut}}{T_{uc}} \frac{\left(1 - f(N_{u,est}, W_t)^{\frac{1-\gamma}{\gamma}}\right)}{\left(PR_c^{\frac{\gamma-1}{\gamma}} - 1\right)}$$

$$\eta_c(W_c, N_{u,est}) \eta_t(W_t, N_{t,est})$$

In the second case and the third case, when the turbine bypass is open, the following expressions apply:

$$\varepsilon_{t,OPENED,Put} = \frac{POW_{t,OPENED,Put}}{POW_{t,CPR}} \qquad \text{(eq. 33)}$$

$$= \frac{W_{t,est}}{W_c} \frac{T_{ut}}{T_{uc}} \frac{\left(1 - P_{ut}/P_{dt,est}^{\frac{1-\gamma}{\gamma}}\right)}{\left(PR_c^{\frac{\gamma-1}{\gamma}} - 1\right)}$$

$$\eta_c(W_c, N_{tc,est}) \eta_t(W_t, N_{t,est})$$

$$\varepsilon_{t,OPENED,Xthp} = \frac{POW_{t,OPENED,Xthp}}{POW_{t,CPR}} \qquad \text{(eq. 34)}$$

$$= \frac{W_{t,est}}{W_c} \frac{T_{est}}{T_{uc}} \frac{\left(1 - P_{ut,est}/P_{dt,est}^{\frac{1-\gamma}{\gamma}}\right)}{\left(PR_c^{\frac{\gamma-1}{\gamma}} - 1\right)}$$

$$\eta_c(W_c, N_{tc,est}) \eta_t(W_t, N_{t,est})$$

The aim of introducing the function f is to put the diagnostic criterion in standard form and to show the dependencies with respect to the variables which can exhibit a dispersion. With this criterion, it is possible to determine an imbalance between the powers seen by the compressor and by the turbine. In this sense, in case of an air intake fault or loss of turbomachine efficiency, the criterion will be above 1.

In the absence of turbocharger failure, that is to say when the efficiency of the turbine $r|_t$ and of the compressor $r|_c$ are those predicted by the mappings for an intact turbocharger conforming to the production, and in the absence of errors in measuring parameters (pressure, temperature, etc) of any kind, this ratio c is theoretically equal to 1. In the case of a supercharging fault (for example a loss of turbine efficiency), the power ratio $\epsilon$ becomes greater than 1.

Figure 3:
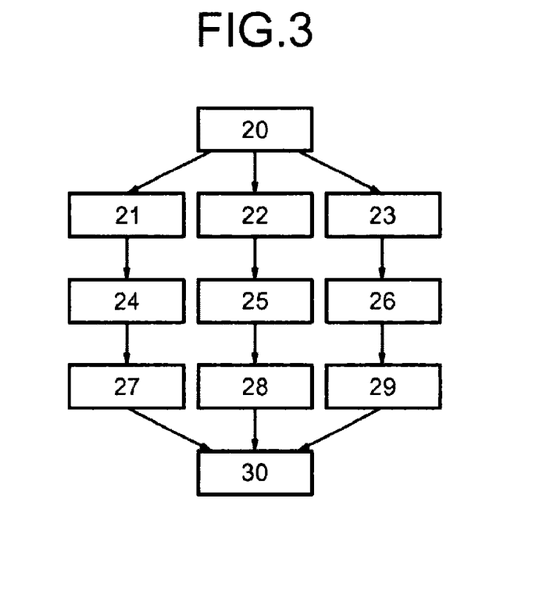
FIG. 3 illustrates a method for diagnosing the failure of a power train.

The diagnostic method during a first step 20 determines the position of the bypass of the high-pressure turbine. If the bypass is in the closed position, the method continues to the step 21, otherwise the pressure upstream of the high-pressure turbine is determined. If the pressure upstream of the high-pressure turbine can be determined, the method continues to the step 22 otherwise the method continues to the step 23.

In the step 21, the flow rate of the turbine $W_t$ is measured then the expansion ratio of the turbine $PR_{t,est}$ is estimated by the application of equation 15, then the power of the turbine $POW_{t,CLOSED}$ is estimated by the application of equation 16.

In the step 22, the pressure upstream of the turbine $P_{ut}$ is measured. The expansion ratio $PR_{t,est}$ is then estimated by the application of equation 17. The flow rate of the turbine $W_{t,est}$ is then estimated by the application of equation 18 and then the power of the turbine $POW_{t,OPENED,Put}$ is estimated by the application of equation 19.

In the step 23, the position of the bypass $X_th_p$ is measured, then the section of the bypass $S_th_p$ is determined by the application of equation 20. The temperature upstream of the turbine $T_{ut}$ is measured, then the flow rate across the bypass of the high-pressure turbine $W_th_{p,est}$ is estimated by the application of equation 20 and of equation 21. The flow rate of the turbine $W_{t,est}$ is estimated by the application of equation 22 and then the expansion ratio $PR_{t,est}$ is estimated using the measurement of the flow rate of the compressor $W_c$ and by the application of equations 24 and 25. The expansion ratio is then reintroduced into the equations 21 to 23 in order to obtain a more accurate value by recurrence on the equations 21 to 25. Once a stable value of the expansion ratio $PR_{t,est}$ has been obtained, the power of the turbine $POW_{t,oPENED,xthp}$ is estimated by the application of equation 26.

After the step 21, the method continues with a step 24 during which the power of the turbine is determined as a function of the data originating from the compressor. For this, the supercharging pressure $P_{sg}$, and the flow rate of the compressor Wc, are measured. The compression ratio $PR_{c,est}$ is then estimated by the application of equation 27. The speed of rotation of the turbocharger $N_{tc,est}$ is then estimated by the application of equation 28 and from the measurement of the speed of rotation of the engine $N_e$. The power of the compressor $POW_{c,est}$ is then estimated by the application of equation 29. Finally, the power of the turbine is estimated by the application of equation 30.

After the step 22, the method continues with a step 25, identical to the step 24, during which the power of the turbine is determined as a function of the data originating from the compressor. For this, the supercharging pressure $P_{sg}$, and the flow rate of the compressor Wc, are measured. The compression ratio $PR_{c,est}$ is then estimated by the application of equation 27. The speed of rotation of the turbocharger $N_{tc,est}$ is then estimated by the application of equation 28 and using the measurement of the speed of rotation of the engine $N_e$. The power of the compressor $POW_{c,est}$ is then estimated by the application of equation 29. Finally, the power of the turbine is estimated by the application of equation 30.

After the step 23, the method continues with a step 26, identical to the step 24, during which the power of the turbine is determined as a function of the data originating from the compressor. For this, the supercharging pressure $P_{sg}$, and the flow rate of the compressor Wc, are measured. The compression ratio $PR_{c,est}$ is then estimated by the application of equation 27. The speed of rotation of the turbocharger $N_{tc,est}$ is then estimated by the application of equation 28 and using the measurement of the speed of rotation of the engine $N_e$. The power of the compressor $POW_{c,est}$ is then estimated by the application of equation 29. Finally, the power of the turbine is estimated by the application of equation 30.

On completion of the step 24, the method continues with the step 27 during which the value of the criterion E is determined by the application of equation 32.

On completion of the step 25, the method continues with the step 28 during which the value of the criterion E is determined by the application of equation 33.

On completion of the step 26, the method continues with the step 29 during which the value of the criterion E is determined by the application of equation 34.

The method ends at step 30 during which the criterion E determined in any one of the steps 27, 28 or 29 is compared to predetermined values. Depending on the result of the comparisons, a failure is diagnosed which is transmitted to the onboard computer, and/or computers and control means that can use these data and/or the human-machine interface in order to inform the driver thereof by the illumination of a warning signal.

Figure 4:
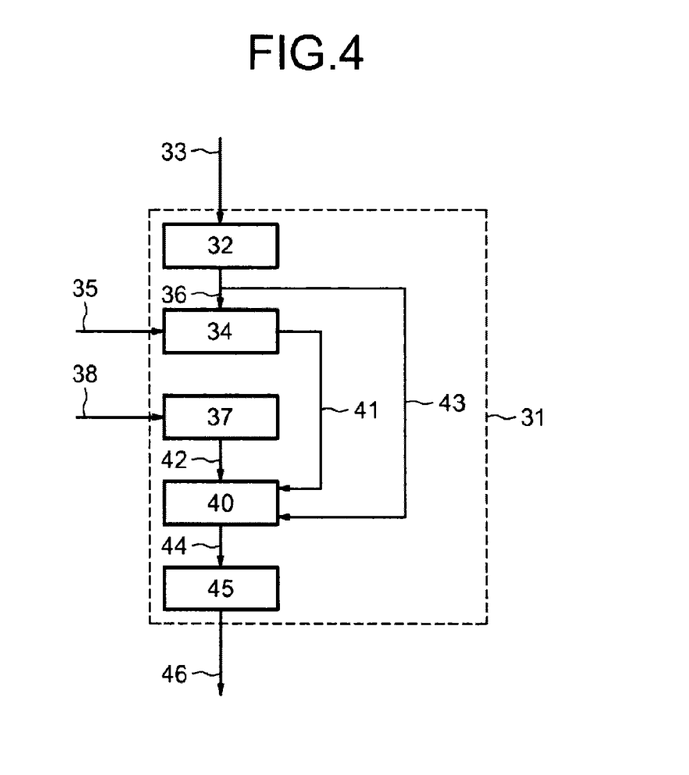
FIG. 4 illustrates a diagnostic system for a power train.

FIG. 4 illustrates a diagnostic system 31 for a power train according to the invention. The diagnostic system comprises a means 32 for determining the mode of operation of the power train. Mode of operation should be understood to mean the opening and closure parameters of the different bypasses in accordance with FIG. 2 and the method step 20. The determination means 32 receives at the input the position of the high-pressure bypass $X_t h_p$ and the pressure upstream of the turbine $P_u t$ if it is available. These values are received from sensors or estimators by connection 33.

The determination means 32 is linked at the output to a first means 34 of estimating the power of the turbine suitable for determining the power of the turbine as a function of the variables determined on the turbine side, that is to say as a function of the speed of rotation of the turbine $W_t$, of the temperature upstream of the turbine $T_{ut}$, of the pressure upstream of the turbine $P_u t$, of the speed of rotation of the compressor $W_c$ and of the position of the high-pressure bypass Xthp. These values are received from sensors or estimators via the connection 35. The first estimation means 34 also receives, via the connection 36, a logic signal originating from the determination means 32 indicating which mode of operation is active. Based on this signal, the first estimation means 34 chooses the corresponding model from the stored models (eq. 16, 19 and 26).

The diagnostic system 31 also comprises a second means 37 for estimating the power of the turbine suitable for determining the power of the turbine as a function of the variables determined on the compressor side, that is to say as a function of the speed of rotation of the compressor $W_c$, of the supercharging pressure $P_{sg}$, and of the speed of rotation of the internal combustion engine $N_e$. These values are received from sensors or estimators via the connection 38.

The first means 34 of estimating the power of the turbine and the second means 37 for estimating the power of the turbine are linked at the output to a means 40 for estimating the criterion via the connections 41 and 42 respectively. The means 40 for estimating the criterion applies equation 32 or equation 33 as a function of the logic signal sent by the means 32 and received the bypass 43 of the connection 36.

The criterion 6 is then sent via the connection 44 to a comparison means 45 suitable for comparing the criterion $\epsilon$ to stored values. Depending on the result of the comparison, a failure is determined and a corresponding logic signal is sent via the connection 46.

The diagnostic system and method make it possible to determine the occurrence of a failure or of a leak in the air intake of a power train provided with two staged turbochargers such that the speed of rotation of the high-pressure turbocharger is maintained below a damaging threshold and such that the stoichiometry of the engine is maintained within the regulatory norms.

The invention claimed is:

1. A diagnostic method for a power train including at least one low-pressure turbocharger and at least one high-pressure turbocharger, the high-pressure turbocharger including a high-pressure turbine and a high-pressure compressor, the turbochargers being staged and supplying an internal combustion engine, the power train being installed in an engine vehicle, the method comprising:
   determining a mode of operation of the power train as a function of a position of a high-pressure bypass and of pressure upstream of the high-pressure turbine, the high-pressure bypass being connected between an inlet and an outlet of the high-pressure turbine;
   determining a power of the high-pressure turbine as a function of a first set of data and as a function of the mode of operation;
   determining a power of the high-pressure turbine as a function of a second set of data;
   determining a failure criterion as a ratio between the power of the high-pressure turbine that is a function of the first set of data and the power of the high-pressure turbine that is a function of the second set of data; and
   comparing the failure criterion to stored values to determine whether a failure exists.

2. The diagnostic method as claimed in claim 1, wherein the first set of data is determined on a side of the high-pressure turbine.

3. The diagnostic method as claimed in claim 1, wherein the first set of data includes a speed of rotation of the high-pressure turbine and a temperature upstream of the high-pressure turbine.

4. The diagnostic method as claimed in claim 1, wherein the first set of data includes pressure upstream of the high-pressure turbine and a temperature upstream of the high-pressure turbine.

5. The diagnostic method as claimed in claim 1, wherein the first set of data includes a position of the high-pressure bypass, a temperature upstream of the high-pressure turbine, and a speed of rotation of the high-pressure compressor.

6. The diagnostic method as claimed in claim 1, wherein the second set of data is determined on a side of the high-pressure compressor.

7. The diagnostic method as claimed in claim 1, wherein the second set of data includes a speed of rotation of the high-pressure compressor, a supercharging pressure, and a speed of rotation of the internal combustion engine.

8. A diagnostic system for a power train including at least one low-pressure turbocharger and at least one high-pressure turbocharger, the high-pressure turbocharger including a high-pressure turbine and a high-pressure compressor, the turbochargers being staged, and supplying an internal combustion engine, the power train being installed in an engine vehicle, the diagnostic system comprising:

means for determining a mode of operation of the power train as a function of a position of a high-pressure bypass and of pressure upstream of the high-pressure turbine, the high-pressure bypass being connected between an inlet and an outlet of the high-pressure turbine     a first means for estimating power of the high-pressure turbine, the first means being linked to an output of the means for determining the mode of operation of the power train;

a second means for estimating the power of the high-pressure turbine; and     means for estimating a failure criterion connected at an input to the first means for estimating the power of the high-pressure turbine and to the second means for estimating the power of the high-pressure turbine and at an output to a comparison means configured to compare the failure criterion to stored values.

9. The diagnostic system as claimed in claim 8, wherein the first means for estimating the power of the high-pressure turbine includes at least one means for modeling the high-pressure turbocharger, and the means for modeling is configured to choose a model for estimating the power of the high-pressure turbine based on a signal received from the means for determining the mode of operation of the power train.

10. The diagnostic system as claimed in claim 8, wherein the first means for estimating power of the high-pressure turbine is configured to determining the power of the high-pressure turbine as a function of a first set of data and as a function of the mode of operation, and the first set of data includes a position of the high-pressure bypass, a temperature upstream of the high-pressure turbine, and a speed of rotation of the high-pressure compressor.

* * * * *